(No Model.) 7 Sheets—Sheet 1.

H. W. THURSTON.
MACHINE FOR MAKING FISH OR OTHER NETS.

No. 477,085. Patented June 14, 1892.

Fig. 1.

WITNESSES:
INVENTOR: Henry A. Thurston
BY _______ ATTORNEY.

(No Model.) 7 Sheets—Sheet 2.
H. W. THURSTON.
MACHINE FOR MAKING FISH OR OTHER NETS.
No. 477,085. Patented June 14, 1892.

WITNESSES:
INVENTOR:
Henry W. Thurston
BY
ATTORNEY.

(No Model.) 7 Sheets—Sheet 3.
H. W. THURSTON.
MACHINE FOR MAKING FISH OR OTHER NETS.

No. 477,085. Patented June 14, 1892.

(No Model.)

H. W. THURSTON.
MACHINE FOR MAKING FISH OR OTHER NETS.

No. 477,085. Patented June 14, 1892.

UNITED STATES PATENT OFFICE.

HENRY W. THURSTON, OF BROOKLYN, NEW YORK.

MACHINE FOR MAKING FISH OR OTHER NETS.

SPECIFICATION forming part of Letters Patent No. 477,085, dated June 14, 1892.

Application filed April 14, 1890. Serial No. 347,832. (No model.)

*To all whom it may concern:*

Be it known that I, HENRY W. THURSTON, a citizen of the United States, residing at Brooklyn, in the county of Kings and State of New York, have invented a new and useful Improvement in Machines for Making Fish or other Nets, which improvement is fully set forth in the following specification and accompanying drawings.

My invention consists of a machine for making fish or other nets, embodying devices as follows: first, a series of hooks, each of which is adapted to take hold of two threads of which the net is to be formed and then twist or turn the same so as to form a loop, and next, a shuttle which passes through said loop and forms a knot and a partial mesh, which knot is suitably tightened. The hook then disengages from said threads and next engages with one of the same and an adjacent thread and forms part of another mesh and a knot at the side thereof. Provision is made for rotating the hooks in reverse directions, raising and lowering the hook-carrier, and moving the same to the opposite sides of the feed-throat and imparting longitudinal motions to the carrier, whereby the hooks are placed in position to engage with the threads of meshes partly made and threads aside of the same. Rollers are also employed for carrying away the net as formed, and means provided for varying the intermittent motions of said rollers, whereby the latter are rendered adjustable to different sizes of meshes.

Fig. 6 is a top view of a portion on an enlarged scale. Figs. 7, 8, 9, 12, and 13 are vertical sections of parts shown in Fig. 6, portions of the same being in different positions. Fig. 10 is a side elevation, partly broken away, of the shuttle and bobbin on an enlarged scale. Fig. 13½ represents a perspective view of a portion of the loop-forming hooks, the bar in which they are journaled, and meshes partially and entirely formed. Fig. 16½ is a side elevation of the machine. The remaining views, Figs. 17 to 22, inclusive, illustrate the work.

Similar letters and figures of reference indicate corresponding parts in the several figures.

Referring to the drawings, A designates the frame of the machine, and B designates tables at the top thereof.

Figures 6, 7, 8:
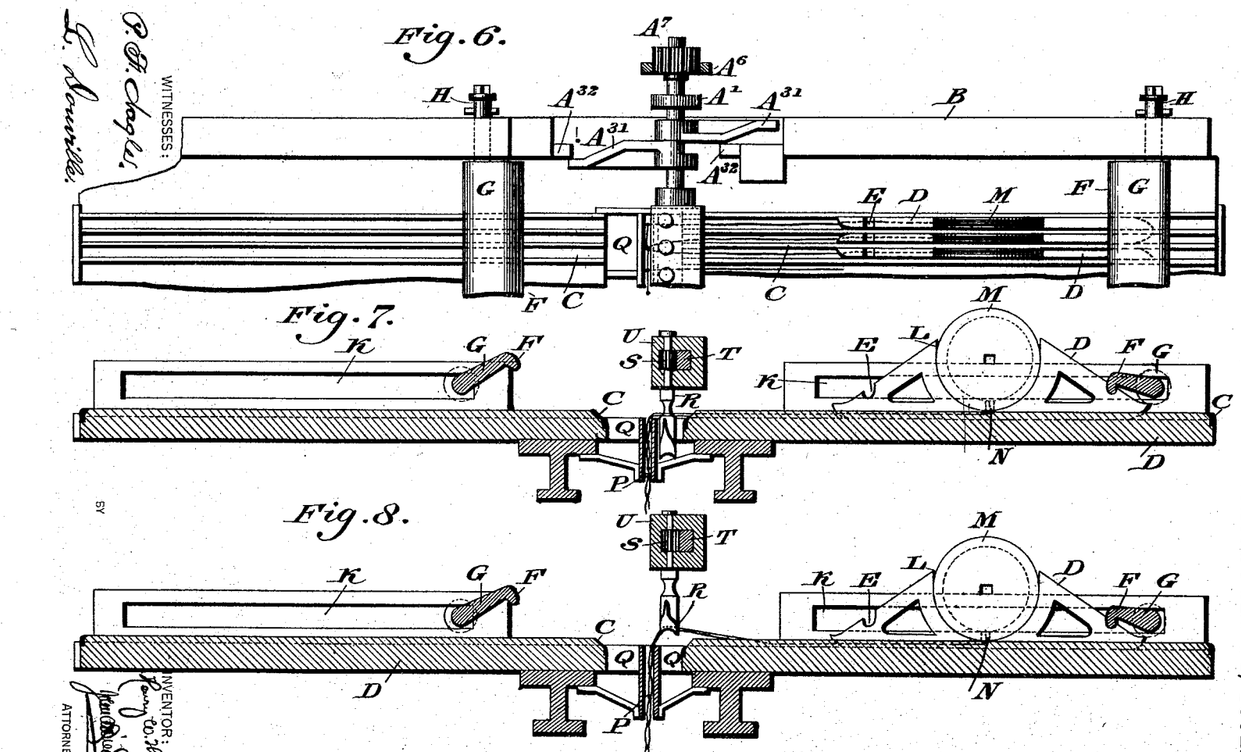

C designates a series of parallel separated bars, which extend vertically and form races for the shuttles D, which are pointed at both ends and have recesses E near said ends for the alternate engagement of hooks F, which latter are secured to heads G, forming shuttle-carriers arranged horizontally over the bars C and at right angle thereto, the ends of said heads carrying journals H, which are mounted on the upper portions of arms or drivers J, the latter being secured on rocker-shafts J′ J², mounted on the frame A, it being noticed that the journals H are freely fitted in slots or guides K, extending transversely on the top of the frame and sustained thereon. In the center of each shuttle on the upper part thereof is a circular depression L, in which is freely fitted the bobbin M, the twine or thread of which is passed from the bobbin through the eye N in the shuttle, both shuttle and bobbin being flat or narrow, as most plainly shown in Fig. 6. Centrally between the tables is a vertical throat P for the passage of the net as woven, and on each side of said throat is a space or channel Q for the reception of hooks R, the shanks of which are mounted in the tubular bar U and carry pinions S, with which meshes the sliding rack T, the latter being fitted within said tubular bar U and having its end piece U' provided with a collar V, with which engages the lever W, whose axis is mounted on the arm X, said lever engaging with the walls of the groove of a cam Y on the shaft Z, it being seen that, owing to said cam Y and the lever W, reciprocating motions are imparted to the rack T, whereby rotary motions in opposite directions are imparted to the pinions S and hooks R. The end piece U' of the rack-bar and the opposite end of the tubular bar U are mounted on rising and falling oscillating arms A', one of which carries the arm X and whose lower ends are forked and embrace the shaft Z, and they also carry studs or rollers $A^2$, which play in the cam-grooves $A^3$ of the wheels A A on the shaft Z, whereby the tubular bar U, with the rack-bar and hooks, is raised and lowered. The cam Y is, in its face view, of the same shape as the cam-groove $A^3$. Consequently the lower end of the lever W remains engaged with said cam Y as the arms A' rise and fall.

Figure 1:
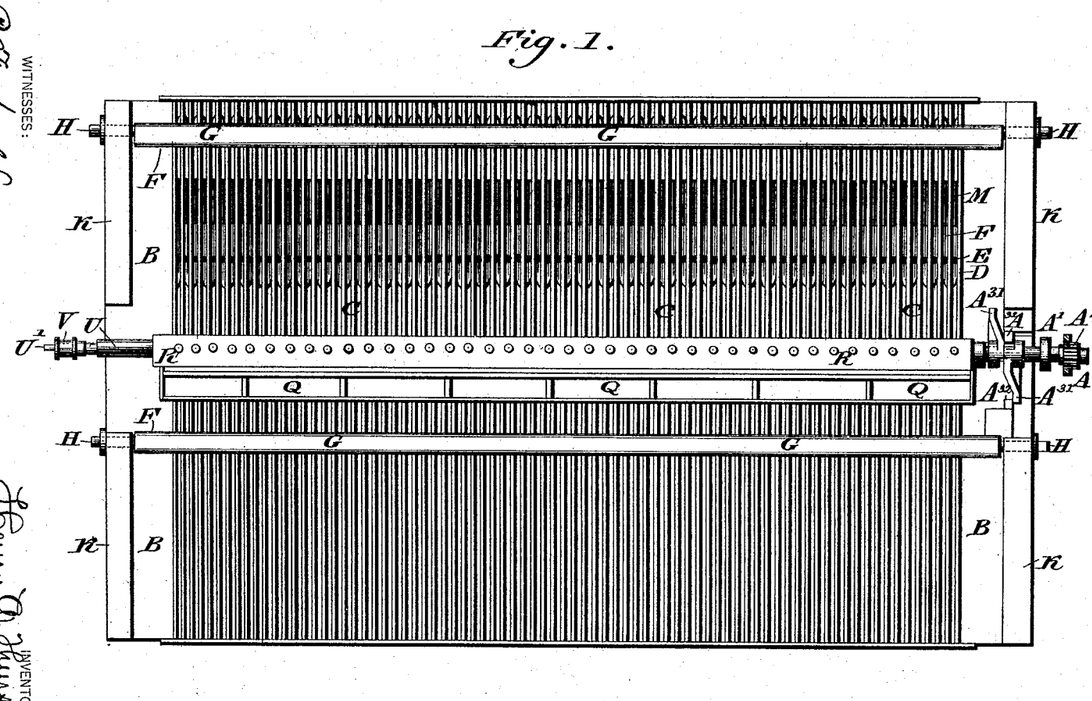
Figure 1 represents a top view or plan of a portion of a machine for making nets embodying my invention.
Figures 2, 16:
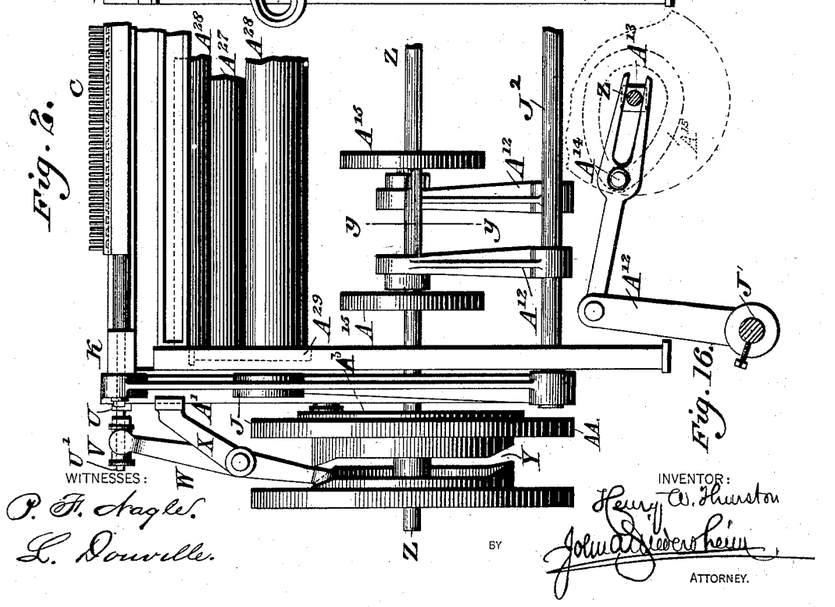
Fig. 2 is a side elevation of a portion of the same.
Fig. 16 is a section of a portion on line $y\,y$, Fig. 2.
Figure 3:
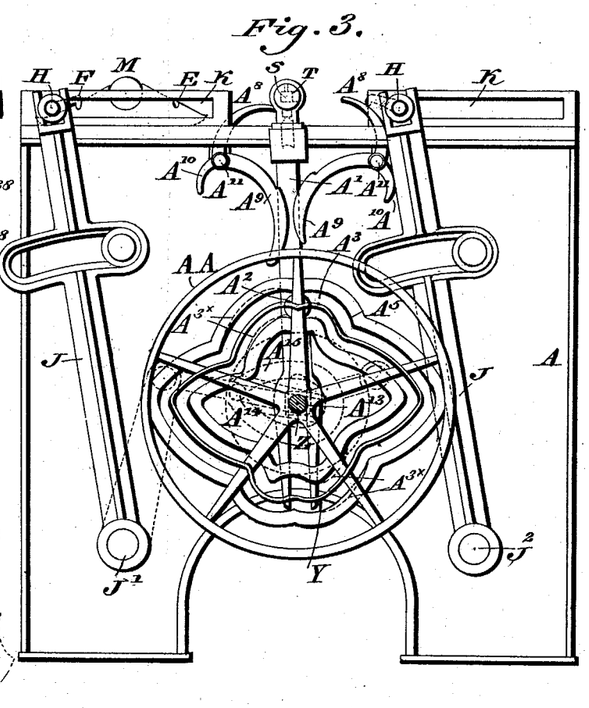
Fig. 3 is an end view thereof, an outer wheel and outer part of one of the cams, an oscillating lever and a rising and falling arm on which said lever is mounted by a bracket having been removed from said figure, it being noticed that the shaft shown in said figure is in section and that the devices for actuating said arm are the same at the opposite end of the machine.
Figures 4, 11:
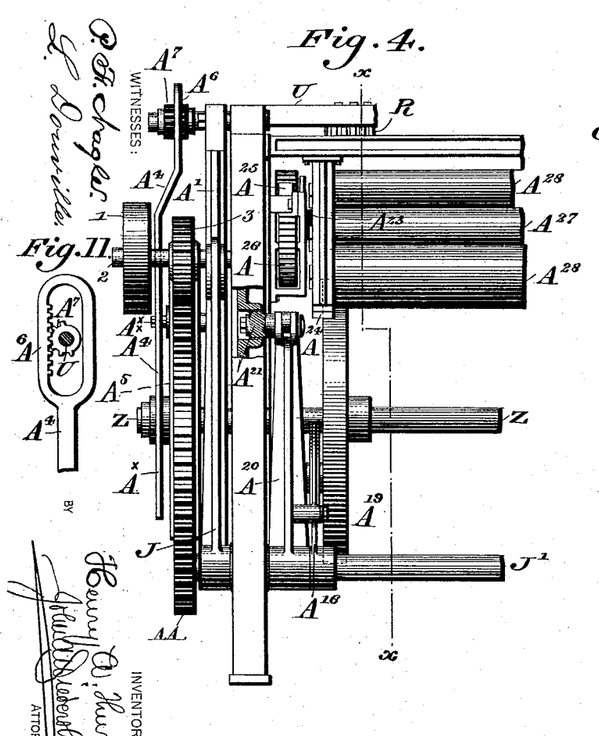
Fig. 4 is a side elevation of a portion embracing the end opposite to Fig. 2.
Fig. 11 is a view of a portion of a rack and pinion employed for imparting inclined positions to the hook-carrier.
Figures 9, 10, 12, 13, 17, 18, 20, 21, 22:
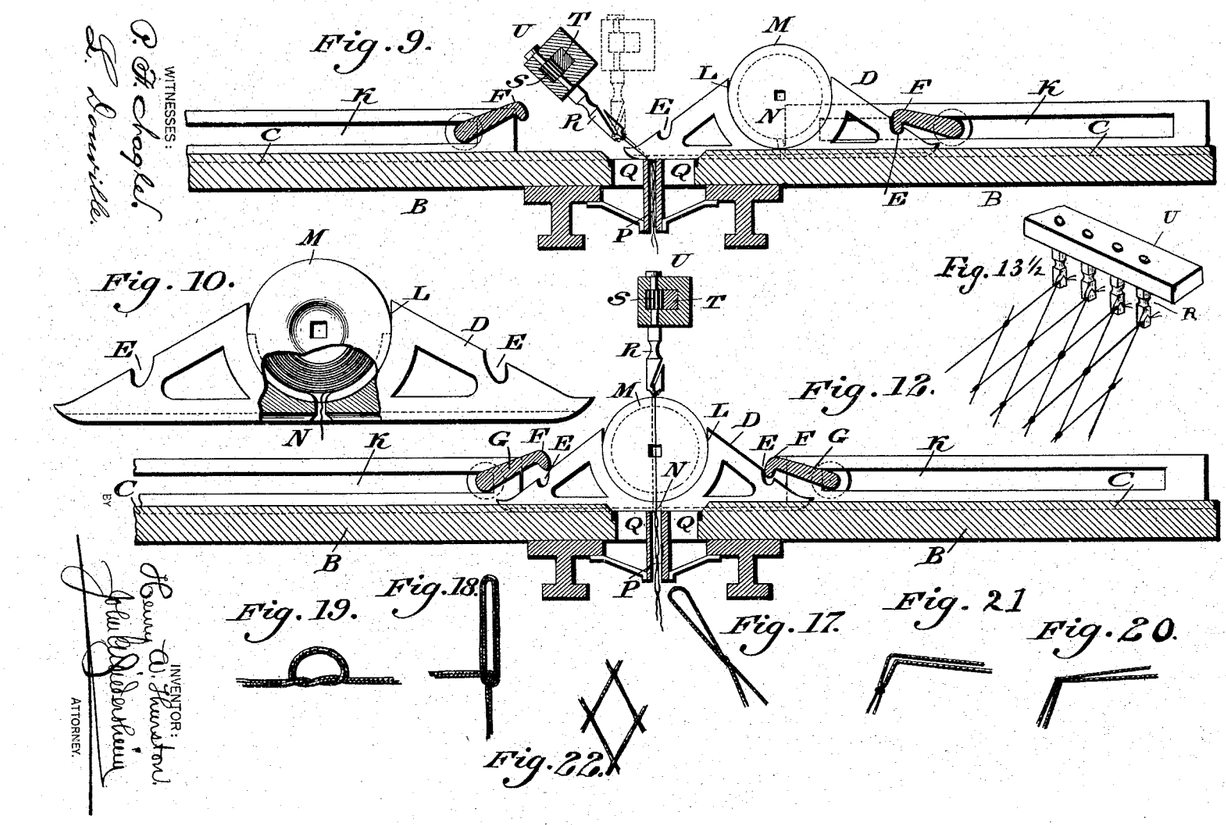
Figure 13:
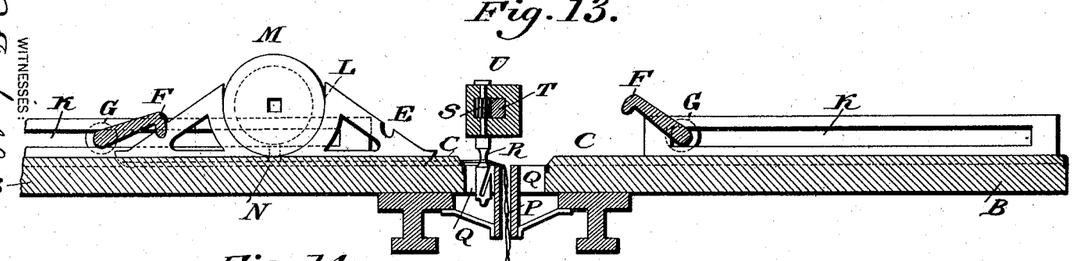
Figure 14:
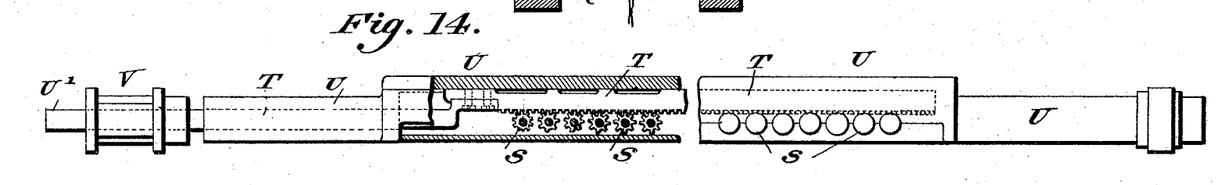
Fig. 14 is a partial top view and partial horizontal section of the hook-carrier and connected parts.
Figure 15:
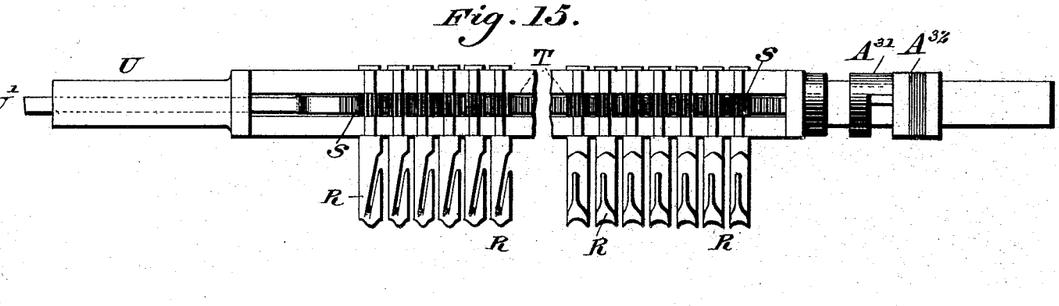
Fig. 15 is a side elevation of the hook-carrier and connected parts, the front thereof being removed.
Figure 16:
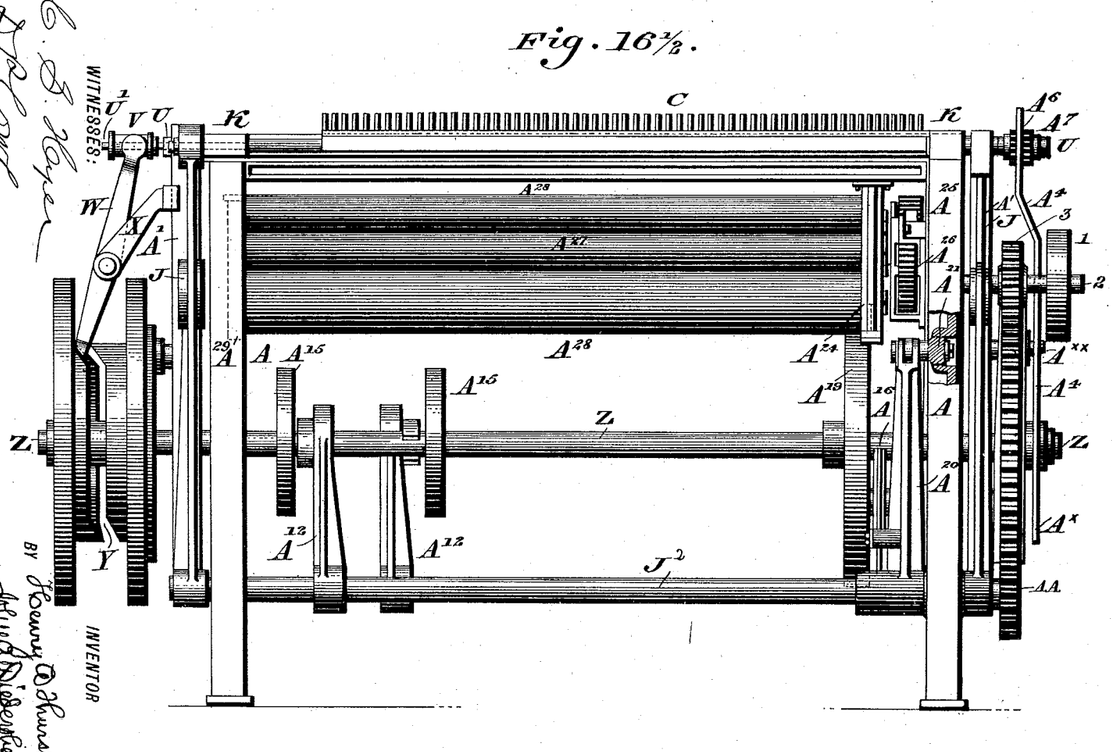

$A^4$ designates a rising and falling oscillating bar, whose lower end is forked, as at $A^\times$, and freely straddles the shaft Z and carries a stud or roller $A^{\times\times}$, which engages with cam-groove $A^5$ of the wheel A A at the corresponding end of the shaft Z, it being remembered that there is a wheel A A, with a cam-groove $A^3$, at each end of the machine; but only one of said wheels is shown toothed, as in Fig. 16½, said toothed wheel having the groove $A^5$ upon its outer base, said groove $A^5$ being a duplicate of the groove $A^3$, excepting that at two points it has slight swells, as at $A^{3\times}$, as shown in dotted lines in Fig. 3, to give the hook-bar the angular motion, as seen in Fig. 9. In all other respects the roller $A^{\times\times}$ follows the groove $A^3$. The upper end of the bar $A^4$ is slotted and has a rack $A^6$ on the inner wall of the slot, the same meshing with a mutilated pinion $A^7$ on the end or journal of the tubular bar U, it being seen that as the bar $A^4$ rises and falls reciprocating rotary motions are imparted to the pinion $A^7$, and consequently to the bar U.

$A^8$, $A^9$, and $A^{10}$ designate cams on shafts $A^{11}$, whose bearings are in the frame A on opposite sides of the middle thereof, (see Fig. 3,) it being noticed that said cams are duplicated at each end of the frame, the cams $A^9$ being below the axes or shafts $A^{11}$, so as to come in contact with the arms or levers A'. The cams $A^8$ are above said axes and are adapted to be alternately engaged by the hooks F, so that the latter ride upon said cams and are thereby raised, thus releasing said hooks from the shuttles. As the bars A' are engaged by the cams $A^9$ and pressed by the same, said bars are moved, thus carrying the hook-bar with them. The cams $A^9$ on the opposite side are then struck by said bars, so that the cams $A^8$ above the same are depressed and allow the shuttle-carrier hook on that side of the machine to engage the shuttles and draw them across to the other side of the machine.

Figure 5:
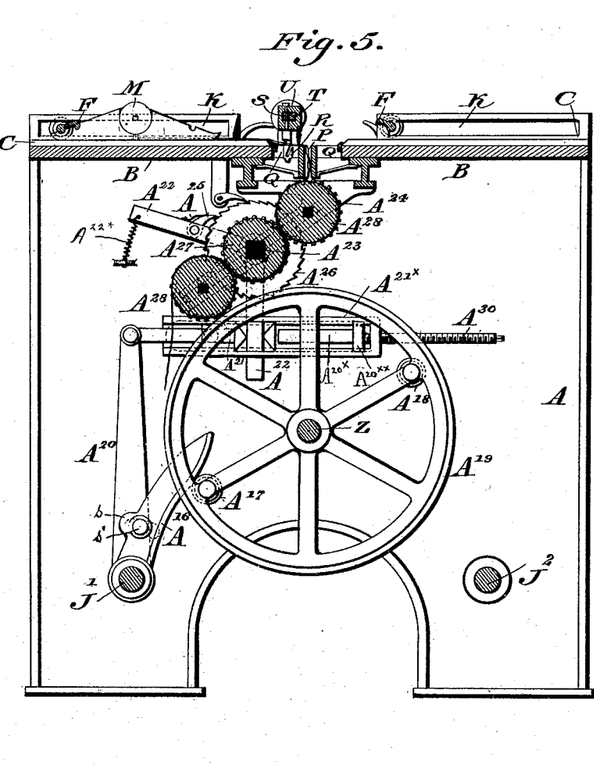
Fig. 5 is a vertical section on line $x\,x$, Fig. 4.

The rock-shafts J' $J^2$ receive motion by means of jointed arms $A^{12}$, one limb of each of which is forked and embraces a box $A^{13}$, freely fitted on the shaft Z, the limbs carrying studs or rollers $A^{14}$, which engage with cams $A^{15}$ on the shaft Z. On the shaft J' is loosely mounted an arm $A^{16}$, which is engaged by studs or rollers $A^{17}$ $A^{18}$ on a wheel $A^{19}$, the latter being secured to the shaft Z. The arm $A^{16}$ is adjustably connected with an arm $A^{20}$ by means of a slot $s$ and screw $s'$, as seen in Fig. 5, and both arms are loosely mounted on the shaft J', the upper end of said arm $A^{20}$ being connected with a horizontal slide $A^{21}$, which is mounted on the guide $A^{21\times}$ on the frame A, said slide having connected with it an elbow-lever $A^{22}$, which is freely mounted on a shaft $A^{23}$, the latter having its bearings on a hanger $A^{24}$, secured to the frame A. The lever $A^{22}$ carries a pawl $A^{25}$, which engages with a ratchet $A^{26}$, secured to the shaft $A^{23}$, the latter having attached to it a feed-roller $A^{27}$, geared to which are feed-rollers $A^{28}$, which are mounted on the hanger $A^{24}$ at one end (see Fig. 5) and a hanger $A^{29}$ on the other end, (see Fig. 2,) it being noticed that the feed-rollers are below the throat P, so as to receive the net as woven and convey the same from the machine. The slide $A^{21}$ has two V-shaped or pointed heads which are cast or otherwise connected thereto, and between the same the lower end of the elbow-lever $A^{22}$ is freely held. Back of the head, opposite to the arm $A^{20}$, is a piece $A^{20\times}$, whose head $A^{20\times\times}$ is movably fitted in the guide $A^{21\times}$. In the end of said guide is a screw $A^{30}$, whose inner end bears against the head $A^{20\times\times}$, whereby the throw of said lever $A^{22}$ may be adjusted, and thus the feed-rollers are rendered adjustable for different sizes of meshes. The return motion of the lever $A^{22}$, and consequently of the pawl $A^{25}$, slide $A^{21}$, and arms $A^{20}$ $A^{16}$, is accomplished by means of the spring $A^{22\times}$, which is connected with said lever $A^{22}$ and a proper part of the frame of the machine.

The end of the hook-bar opposite to the sleeve or collar V carries cams $A^{31}$, which project in opposite directions and are partly oblique in the direction of their length and adapted to engage with upright posts $A^{32}$ on the frame A, so that as the arms A' are struck by the cams $A^9$ when the shuttle-carriers advance one of the cams $A^{31}$ is caused to ride against the contiguous posts $A^{32}$, thus imparting longitudinal motion to said cam, and consequently to the hook-bar. Then as the arms A' make their return motion the opposite cam $A^{31}$ engages with the respective post $A^{32}$, whereby the hook-bar is returned, it being evident that the hook-bar thus receives motion in opposite directions.

The machine receives motion by means of the pulley 1 on the shaft 2, the latter carrying a pinion 3, which meshes with the toothed wheel A A, the latter having the cams and cam-grooves therein, as has been stated.

The operation is as follows: The threads extend from the bobbins over the channel Q and into the middle throat down around the feed-rollers. The hooks descend into channel Q between the threads, as in Fig. 7. The hook-bar receives lateral motion, so as to have the points of the hooks come under two threads and hook on, as in Figs. 8 and 13½. The hooks gradually rise, (see also Fig. 8,) and each carries with it two threads and at the same time gradually turns until it makes three-quarters of a turn, as shown dotted in Fig. 9, forming a loop of the threads, (see Fig. 17,) the hooks continuing to rise, so as to enlarge the loop. (See Fig. 18.) Meanwhile the shuttles have advanced and passed, say, from the right to the left, through the lengthened or enlarged loop beneath the hook, (see Fig. 12,) the bottom of the hooks being channeled to allow the shuttles to come close to said hooks. When the shuttles have passed half through the loops, the bar U gradually descends, the shuttles passing to nearly their full stroke to the left (see Fig. 13,) the hooks being in such a position when descending that the threads are stripped from the ends of the hooks, as also seen in Fig. 13. This makes an open knot as in Fig. 19, said knot being tightened by the shuttles making a further slight motion in completing the full throw to the left for the purpose of tightening the knot, (see Fig. 20,) the feed and taking-up then occurring. (See Fig. 21.) The hook-bar now rises without threads (see Fig. 13) and then again descends between two threads in a manner similar to that shown in Fig. 7, and next rises, carrying with it one of the threads of the previously-formed mesh and a new length of the thread of the shuttle next to it, thus again producing a loop when the shuttles move from left to right through the loops, and the other operations, as in the previous case, are repeated, thus making in each case the meshes whose knots are tight and without liability to slip.

Having thus described my invention, what I claim as new, and desire to secure by Letters Patent, is—

1. The shuttles and shuttle-races and a table for said races, having a central passage, rotatable and sliding heads mounted on said table, hooks projecting inwardly from said heads, and arms carrying said heads, in combination with the shafts J J², with which said arms are connected, the arms A¹² on said shafts, and the cams A¹⁵, operatively connected to and actuating said arms, substantially as described.

2. The shuttles and shuttle-races and a table for said races, having a central passage in the top thereof, in combination with rotatable and sliding heads, hooks projecting inwardly from said heads, arms carrying said heads, shafts connected with said arms, jointed arms secured to said shafts and cams on the frame engaging said jointed arms, and throw-off cams for said heads on opposite sides of said passage, said carrying-arms being at opposite ends of said passage, substantially as described.

3. In a net-weaving machine, shuttles with recesses in opposite ends and races on a table, rising and falling hooks guided on said table, arms carrying the heads of said hooks, and means for operating said arms, in combination with rotary hooks, a tubular bar in which said hooks are mounted, a rack in said bar, pinions on said hooks meshing with said rack, rising and falling arms carrying said bar and rack, a lever for oscillating said rack, and means for operating said lever, and cams for throwing off the hooks from the shutters, said cams being on opposite sides of the center of the table, substantially as described.

4. In a net-weaving machine, shuttles with recesses in opposite ends and races on the table, rising and falling hooks guided on said table, arms carrying the heads of said hooks, and means for operating said arms, in combination with rotary hooks, a tubular bar in which said hooks are mounted, rising and falling arms carrying said tubular bar, and means for operating said arms, a rack in said bar, pinions on said hooks meshing with said rack, a lever for oscillating said rack, means for operating said lever, and cams for throwing off the hooks from the shuttles, said cams being on opposite sides of the center of the table, substantially as described.

5. The shuttles, the tables with races and rising and falling hooks thereon, heads, oscillating arms which carry the same, the hooks and means for supporting and rotating the same, rising and falling arms carrying said means, and means for operating said arms, in combination with cams, which are mounted on the ends of the table and located in the paths of the oscillating and rising and falling arms and the hooks aforesaid.

6. A hook-carrier, means for supporting the same, a pinion on said carrier, and a rising and falling rack mounted on the frame and engaging with the said pinion, in combination with the cams on said carrier and posts against which the cams abut, said posts being on opposite sides of said cams, substantially as described.

7. A bar having a rack fitted thereto and hooks with pinions mounted therein, in combination with rising and falling arms A′, means for vibrating said arms on which said bar is mounted, the oscillating arm or lever W, which is connected with said rack-bar, and the cams A³¹ on the device which carries the hooks and connected parts, and the posts A³² on opposite sides of said cams, whereby the hooks are rotated and the bar receives reciprocating motion, substantially as described.

8. The rollers A²⁷ A²⁸, in combination with a ratchet on the shaft of one of said rollers, a pawl mounted on an arm or lever engaging said ratchet, a slide engaging with said lever, arms A²⁰ A¹⁶, connected with said slide, a shaft carrying said arms, and means for operating said arms, combined substantially as described.

9. The rollers A²⁷ A²⁸, a pawl and ratchet, a lever carrying said pawl, and a slide engaging said lever, in combination with means for operating said slide, consisting of the arms $A^{16}$ and $A^{20}$, and a wheel engaging the arm $A^{16}$, as described.

10. The rollers $A^{27}$ $A^{28}$, a ratchet on the roller $A^{27}$, a pawl engaging said ratchet, and a lever carrying said pawl, said rollers $A^{27}$ and $A^{28}$ being geared together, in combination with a slide which engages said lever, and the arms $A^{16}$ and $A^{20}$, and a wheel engaging the arm $A^{16}$ for operating said slide, the support of the latter being provided with a screw, which may be set nearer to and farther from the slide for adjusting the feeding action of said rollers.

H. W. THURSTON.

Witnesses:
   J. W. FINSER,
   GEO. W. PAYNTAR.